3,301,124
INDIVIDUAL TRACE CORRECTOR FOR SHIFTING TRACES ON A RECORD
George B. Amery, Metairie, La., assignor, by mesne assignments, to Esso Production Research Company, Houston, Tex., a corporation of Delaware
Filed Dec. 3, 1962, Ser. No. 241,958
1 Claim. (Cl. 88—14)

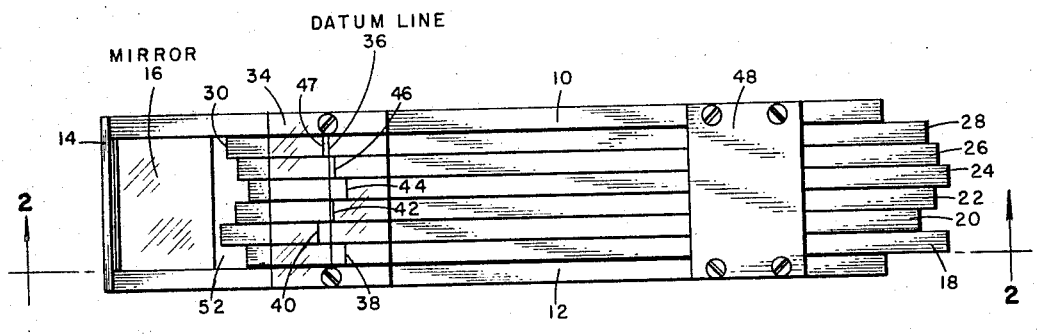
FIG. 1.
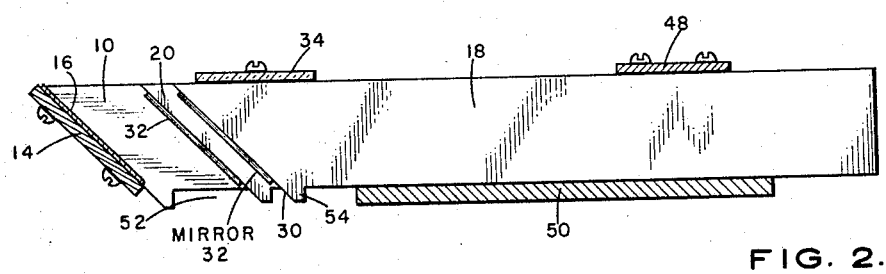
FIG. 2.
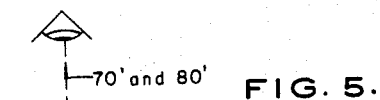
FIG. 5.
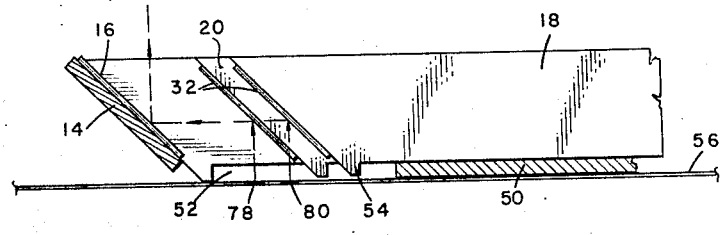
FIG. 3.
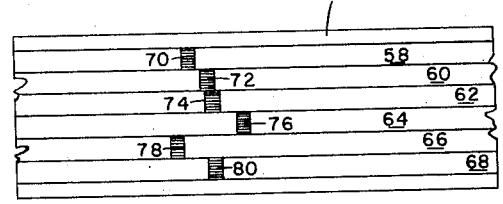
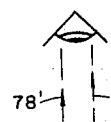
FIG. 4.
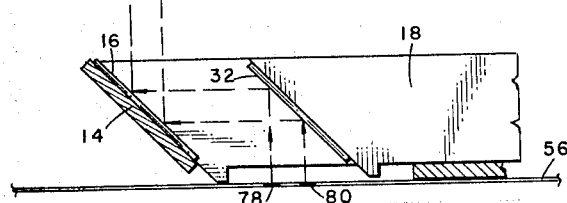
INVENTORS.
GEORGE B. AMERY,
BY *Frank S. Troidl*
ATTORNEY.

This invention relates to prospecting for oil and gas. More particularly, this invention is an apparatus for determining corrections to be made to traces, such as seismic traces, recorded on a recording medium.

One of the problems involved in reflection seismic interpretation is the effect of the low velocity layer on the information recorded at the surface. Special attention must always be directed to the low velocity layer in seismic prospecting because the usual heterogeneous character of this layer leads to inaccurate results if the anomalous velocity in this layer is not taken into account. The low velocity layer plays but a small part in the subsurface section despite its relatively large effect on travel time data and must be taken into account before the data can be analyzed.

The invention to be described herein by allowing the interpreter to optically shift each of the seismic traces so as to smooth the reflections enables him to determine what time displacement of each trace will best eliminate the effects of the low velocity layer.

The invention, as well as its many advantages, will be understood by reference to the following detailed description and drawing in which:

FIG. 1 is a top plan view of the individual trace corrector;

FIG. 2 is a sectional view taken along the line 2—2 of FIG. 1;

FIG. 3 is an idealized variable density record useful in explaining the operation of the individual trace corrector; and FIGS. 4 and 5 are diagrams useful in explaining the manner in which the images of events on the record are produced.

Referring to the drawings and more particularly to FIG. 1, the individual trace corrector includes a frame having upright members 10 and 12 and an inclined member 14. The inclined member 14 is provided with a light-reflecting surface. The light-reflecting surface may be a mirror 16 attached to member 14.

A plurality of movable members 18, 20, 22, 24, 26, and 28 is mounted in the frame. The movable members are independently movable toward and away from the inclined mirror 16. As shown in FIG. 2, each of the movable members is provided with an edge 30 which faces and is parallel to the mirror 16. The edge 30 of each of the movable members has included thereon a light-reflecting surface. This light-reflecting surface may be a mirror such as mirror 32 shown in FIG. 2.

A transparent cross plate member 34 having a datum line 36 which extends across the movable members is mounted across the top of the frame. Also, index lines 38, 40, 42, 44, 46, and 47 are provided on members 18, 20, 22, 24, 26, and 28, respectively. A second cross plate 48 is mounted across the frame members 10 and 12 in order to help keep the slidable members within the frame.

As shown in FIG. 2, a bottom plate 50 is mounted across the frame members 10 and 12. The bottom plate 50 does not cover the entire bottom portion of the frame member, thus leaving a space 52. Each of the slidable members includes a stop member, such as member 54, which moves within the space 52.

The individual trace corrector shown and described in FIG. 1 and FIG. 2 may be used for optically displacing the image of each of a plurality of traces with respect to one another. For example, FIG. 3 shows in idealized form the type of record obtained in a variable density-type record. The record 56 is shown as having six variable density traces recorded thereon. These six traces are identified by the numerals 58, 60, 62, 64, 66, and 68. A particular event is represented by the marks 70, 72, 74, 76, 78, and 80 on traces 58, 60, 62, 64, 66, and 68, respectively.

In applying the corrections to each of the traces on record 56, each sliding member is displaced along the trace which the sliding mirror is reflecting. The corrector preferably consists of one slidable member for each seismic trace to be corrected. The width of each of the slidable members 18, 20, 22, 24, 26, and 28 is preferably equal to the width of the trace it is reflecting.

The manner in which the optical displacement of the images is accomplished is illustrated in FIG. 4 and FIG. 5. Referring to FIG. 4, the event 80 and the event 78 are shown as heavy dark lines. If the slidable member 18 is placed over trace 68 and the slidable member 20 is placed over trace 66, slidable member 18 will reflect event 80 and slidable member 20 will reflect event 78. If slidable members 18 and 20 are aligned, the images of events 80 and 78 will appear to the viewer as displaced by the same amount as they are actually displaced on the record. The images of events 78 and 80 are shown in FIG. 4 as 78' and 80', respectively. However, as shown in FIG. 5, if the slidable member 20 is moved closer to mirror 16, the image of event 78 will be displaced until the image 78' of event 78 and the image 80' of event 80 are aligned. The amount of displacement is indicated by the distance the index line 40 is moved from the datum line 36 on cross plate 34. In a similar manner, all the other events are aligned.

After all the events are aligned, the interpreter can determine what time displacement for each trace will best eliminate the effects of the varying velocity in the low velocity layer. Such information may then be used to remake the original record and eliminate the distortion caused by low velocity layer variation.

I claim:

Individual trace corrector apparatus for optically shifting seismic traces on a seismic record comprising:

a frame having an inclined stationary light-reflecting surface mounted adjacent one end thereof;

a plurality of members slidably arranged in said frame for independent movement toward and away from said stationary light-reflecting surface;

one edge of each of said slidable members having an inclined light-reflecting surface facing, and spaced from, and parallel to said stationary light-reflecting surface and arranged such that each slidable light-reflecting surface is capable of reflecting to said stationary light-reflecting surface a different seismic trace of a seismic record; and means on said slidable members for indicating the amount of movement of each slidable member from a predetermined position.

References Cited by the Examiner
UNITED STATES PATENTS

| | | | |
|---|---|---|---|
| 2,501,550 | 3/1950 | Tamagna et al. | 33—1 |
| 2,747,284 | 5/1956 | Christoph | 88—14 X |

JEWELL H. PEDERSEN, *Primary Examiner.*

T. L. HUDSON, O. B. CHEW, *Assistant Examiners.*